United States Patent
Dohmann et al.

(10) Patent No.: US 11,298,847 B2
(45) Date of Patent: Apr. 12, 2022

(54) DEVICE AND METHOD FOR CUTTING AN EXTRUDED PIPE TO LENGTH

(71) Applicant: BATTENFELD-CINCINNATI GERMANY GMBH, Bad Oeynhausen (DE)

(72) Inventors: Heinrich Dohmann, Hoexter (DE); Klaus Becker, Loehne (DE); Joerg Droege, Kerken (DE)

(73) Assignee: BATTENFELD-CINCINNATI GERMANY GMBH, Bad Oeynhausen (DE)

(*) Notice: Subject to any disclaimer, the term of this patent is extended or adjusted under 35 U.S.C. 154(b) by 0 days.

(21) Appl. No.: 16/973,833

(22) PCT Filed: Jun. 10, 2019

(86) PCT No.: PCT/EP2019/065077
§ 371 (c)(1),
(2) Date: Dec. 10, 2020

(87) PCT Pub. No.: WO2019/238608
PCT Pub. Date: Dec. 19, 2019

(65) Prior Publication Data
US 2021/0245412 A1 Aug. 12, 2021

(30) Foreign Application Priority Data

Jun. 15, 2018 (DE) .................. 10 2018 114 472.4
Jun. 15, 2018 (DE) .................. 10 2018 114 473.3
Jun. 15, 2018 (DE) .................. 10 2018 114 474.1

(51) Int. Cl.
*B26D 3/16* (2006.01)
*B29C 48/09* (2019.01)
(Continued)

(52) U.S. Cl.
CPC ............ *B26D 3/166* (2013.01); *B21C 23/085* (2013.01); *B26D 3/16* (2013.01); *B29C 48/0022* (2019.02);
(Continued)

(58) Field of Classification Search
CPC ..... B29C 48/0022; B29C 48/09; B29C 48/90; B29C 48/901; B26D 3/16; B26D 3/166;
(Continued)

(56) References Cited

U.S. PATENT DOCUMENTS 5,173,075 A * 12/1992 Wadell .................. B26D 3/16 452/46
9,914,231 B2 * 3/2018 Droege .................. B26D 1/58
(Continued)

FOREIGN PATENT DOCUMENTS

DE 102010040967 A1 3/2012
DE 102013220618 A1 4/2015
(Continued)

*Primary Examiner* — Seyed Masoud Malekzadeh
(74) *Attorney, Agent, or Firm* — Leydig, Voit & Mayer Ltd.

(57) ABSTRACT

A method cuts an extruded pipe to length using a separating device. The separating device includes a separator rotating about an extrusion axis of the extruded pipe, the separator being rotatably mounted in the separating device, and cutting tools being arranged on the separator. The cutting tools are configured to carry out the separation. The method includes transferring energy to move the cutting tools. The energy is transferred from a stationary outer region of the separating device to a movable inner region of the separating device. The energy is transferred continuously or cyclically and the transferred energy is buffered in an energy storage device. The energy is transferred inductively or capacitively. A discharge time of the energy storage device is between 2% and 25% of a total separation cycle.

7 Claims, 5 Drawing Sheets

(51) Int. Cl.
  *B29C 48/90* (2019.01)
  *B21C 23/08* (2006.01)
  *B29C 48/00* (2019.01)
  *B29L 23/00* (2006.01)

(52) U.S. Cl.
  CPC .............. *B29C 48/09* (2019.02); *B29C 48/90* (2019.02); *B29L 2023/22* (2013.01)

(58) Field of Classification Search
  CPC ... B26D 1/60; B26D 1/58; B26D 1/62; B26D 2001/623; B26D 5/08; B26D 5/083; B26D 5/086; B26D 5/14; B26D 5/16; B26D 5/18
  See application file for complete search history.

(56) References Cited

U.S. PATENT DOCUMENTS

| 9,969,096 B2 * | 5/2018 | Droege | .................... B26D 1/60 |
| 2016/0257014 A1 * | 9/2016 | Droege | .................... B26D 1/60 |
| 2016/0263761 A1 * | 9/2016 | Droege | .............. B29C 48/0022 |

FOREIGN PATENT DOCUMENTS

| DE | 102013220622 A1 | 4/2015 |
| WO | WO 2014153925 A1 | 10/2014 |

* cited by examiner

DEVICE AND METHOD FOR CUTTING AN EXTRUDED PIPE TO LENGTH

CROSS-REFERENCE TO PRIOR APPLICATIONS

This application is a U.S. National Phase application under 35 U.S.C. § 371 of International Application No. PCT/EP2019/065077, filed on Jun. 10, 2019, and claims benefit to German Patent Applications No. DE 10 2018 114 472.5, filed on Jun. 15, 2018, DE 10 2018 114 473.3, filed on Jun. 15, 2018, and DE 10 2018 114 474.1, filed on Jun. 15, 2018. The International Application was published in German on Dec. 19, 2019, as WO 2019/238608 A1 under PCT Article 21(2).

FIELD

The present invention relates to a method for cutting an extruded plastic pipe to length by a separating device, and a separating unit rotating about the extrusion axis of the extruded pipe.

BACKGROUND

DE 102010040967 A1, for example, describes a method for cutting an extruded plastic pipe to length by means of a separating device, which comprises at least one cage rotating about the extrusion axis of the extruded pipe, and having a swing arm and a holder for a cutting tool, as well as a cutting blade arranged thereon. The rotating cage is in a defined initial position in a rest location, and a rechargeable battery is docked to a charging station. A cutting pulse initiates the following steps in the sequence indicated: decoupling the rechargeable battery from the charging station, rotating the cage about the extrusion axis, pivoting the swing arm inward in the direction of the central axis of the pipe by means of a servo drive until the set penetration depth is achieved, return of the swing arm to the initial position, stopping the rotation of the cage, returning the cage to the defined initial position, and coupling the rechargeable battery to the charging station.

However, the disadvantage of this method is that the rechargeable battery has to be repeatedly brought back into the initial position for charging, requires a relatively long time before it has been recharged and remains here for only a very short time to carry out the charging process.

SUMMARY

An embodiment of the present invention provides a method the cuts an extruded pipe to length using a separating device. The separating device includes a separator rotating about an extrusion axis of the extruded pipe, the separator being rotatably mounted in the separating device, and cutting tools being arranged on the separator. The cutting tools are configured to carry out the separation. The method includes transferring energy to move the cutting tools. The energy is transferred from a stationary outer region of the separating device to a movable inner region of the separating device. The energy is transferred continuously or cyclically and the transferred energy is buffered in an energy storage device. The energy is transferred inductively or capacitively. A discharge time of the energy storage device is between 2% and 25% of a total separation cycle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
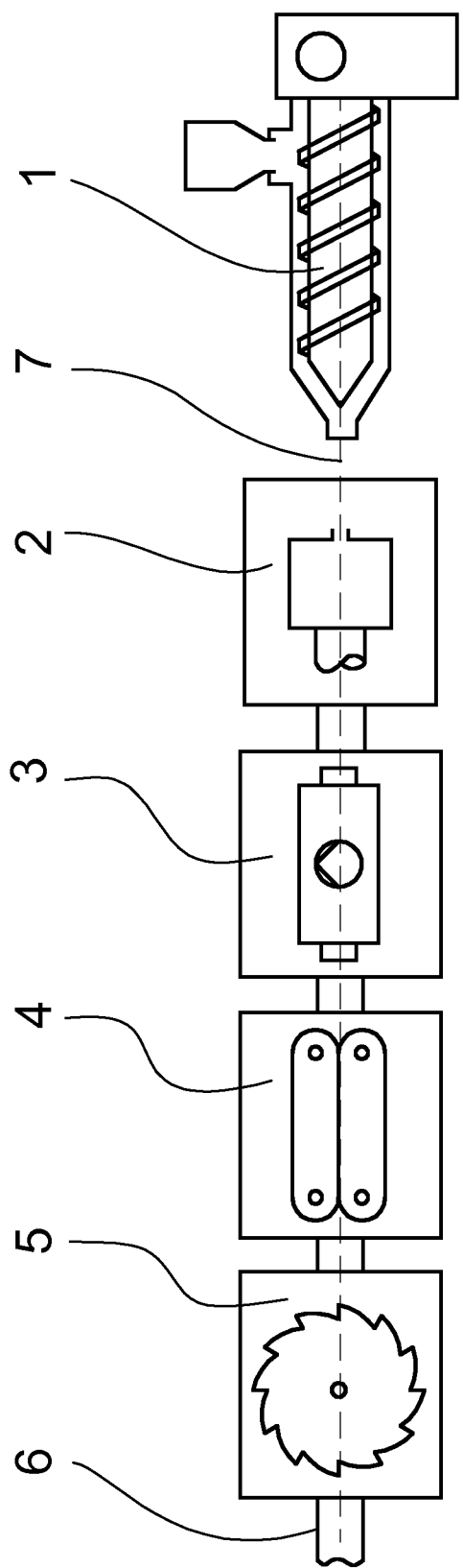
FIG. 1 shows a typical extrusion line.

Embodiments of the present invention provide a method in which at least the above-discussed disadvantages are not present and in which efficient energy transfer is nevertheless possible. Embodiments of the present invention provide that the discontinuous energy requirements of the separating device and hence the required energy peaks should be accommodated.

Embodiments of the present invention achieve their advantages due to, at least in part, providing that the energy is transferred from a stationary outer region to a movable inner region, wherein the energy is transferred continuously or cyclically and the transferred energy is buffered in an energy storage device, wherein the energy is transferred inductively or capacitively, and wherein the discharge time of the energy storage device is between 2% and 25% of the total separation cycle.

In the cutting of pipes, the separating device is generally taken along automatically during the extrusion process by the axial movement of the pipe, and energy is required only during the actual cut-off process. This energy requirement differs depending on the separating device used and the pipe dimensions. This energy requirement is transferred by means of relatively large electric contacts.

The present invention now offers the possibility of transferring energy continuously to the inner region by means of low currents, e.g. in the 24 V range, and of temporarily storing the energy in an energy storage device. During the actual separating process, the additional energy can be made available from the energy storage device in order to carry out the separating process. Moreover, it is not necessary, when using 24 V, to make provisions for additional safety measures, e.g. safeguarding against an electric shock.

It is particularly advantageous if a capacitor is used as an energy storage device. In particular, special capacitors such as gold caps, also referred to as supercapacitors, are suitable for use here. Gold caps are capacitors that can absorb energy quickly, but can also release energy quickly, which is highly advantageous for the discontinuous energy requirement during the cutting process. Moreover, they are more suitable than rechargeable batteries for surviving a high number of charging and discharging cycles without damage.

Various possibilities are provided for energy transfer. The energy can be transferred contactlessly by induction or, alternatively, capacitively.

Thus, the energy can be transferred by near-field communication methods. This involves coupling by means of capacitive fields, magnetic induction (MI) and magnetic resonance (MR). The energy is thus transferred via a clearance of a few centimeters. Here, a few watts up to several kilowatts of power can be transferred.

This contactless energy transfer has the advantages over conventional contact conductors that it is absolutely maintenance-free, does not produce abrasion, is not subject to wear, and is also safe to touch (no live components). Contamination, moisture or temperature effects do not result in any impairment.

However, there are also belts provided with a metal core that are suitable for energy transfer. The energy can be transferred with the aid of a drive chain or a gearwheel connection.

Special bearings are also available with a stator in the outer part and a rotor in the inner part, and these can be used for continuous transfer of the energy.

However, the use of sliding contacts is furthermore also possible. However, these can then be minimized in terms of their dimensions, and the design of the contacts, which bear this load in a stable manner, because, as already stated, the current that has to be transmitted is low.

This transfer by way of sliding contacts can take place continuously via a slip ring but also cyclically via contact points.

The achievement of the object in respect of the device is characterized, in conjunction with the preamble of claim 8, in that the bearings of the separating unit are embodied in such a way that energy can be transferred from an inner region to an outer region, wherein the transfer takes place from a stator to a rotor by contact of the rolling elements, wherein the bearing is filled with a conductive fluid, thereby allowing a continuous transfer of energy.

The rolling element has linear contact, not point contact, thereby improving energy transfer.

In accordance with a development, the rolling element is additionally provided with an elastic, electrically conductive surface, thereby additionally ensuring good contact between the two lines.

The separating cycle that can be carried out by this method, which may be supported by an embodiment of a device according to the invention, is described as follows:

The separating carriage is positioned in the inlet region of the separating device, and is synchronized with the current production line (matching of speed etc.), and the clamping device is clamped onto the pipe to enable the separating device to travel along with it, as it were.

The separating tools (single-point tools, cutting blades or saw blades), which may also be devices for chamfering the pipe, move toward the central axis of the pipe in order then to sever it according to the specifications, e.g. from the machine control system. It is in this part of the separating process that most of the energy drawn from the energy storage device is required.

After the separating process, the clamping device releases the connection with the pipe again, the separating device moves back into the initial position and recharges the energy storage device in the process. Depending on the speed of extrusion and the required pipe length, a corresponding waiting time may arise. Owing to the different conditions with respect to dwell time, separating speed, pipe diameter etc., the discharge time of the energy storage device may also be less than 25% of the separating cycle, e.g. only up to 10% or even less, at 2%.

During this process, a measuring wheel controls the entire cycle and monitors the accumulating meters of pipe produced.

It is furthermore possible to perform charging of the energy storage device up to a point where so much energy has been stored that the separating cycle described above can be carried out entirely by means of the energy supply from the energy storage device.

FIG. 1 shows a typical extrusion line of the kind that is used nowadays for profile extrusion, whether for the production of window profiles or pipes. It shows an extruder 1, in which plastic is melted and conveyed continuously for shaping into the extrusion die 2. This is followed by a sizing and cooling station 3, and, depending on the profile, additional cooling stations may be used. The cooling stations are followed by a withdrawal device 4. In order to trim the continuous profiles 6 to the desired length, a separating device 5 is arranged downstream. The extrusion axis is referred to by reference numeral 7.

Figure 2:
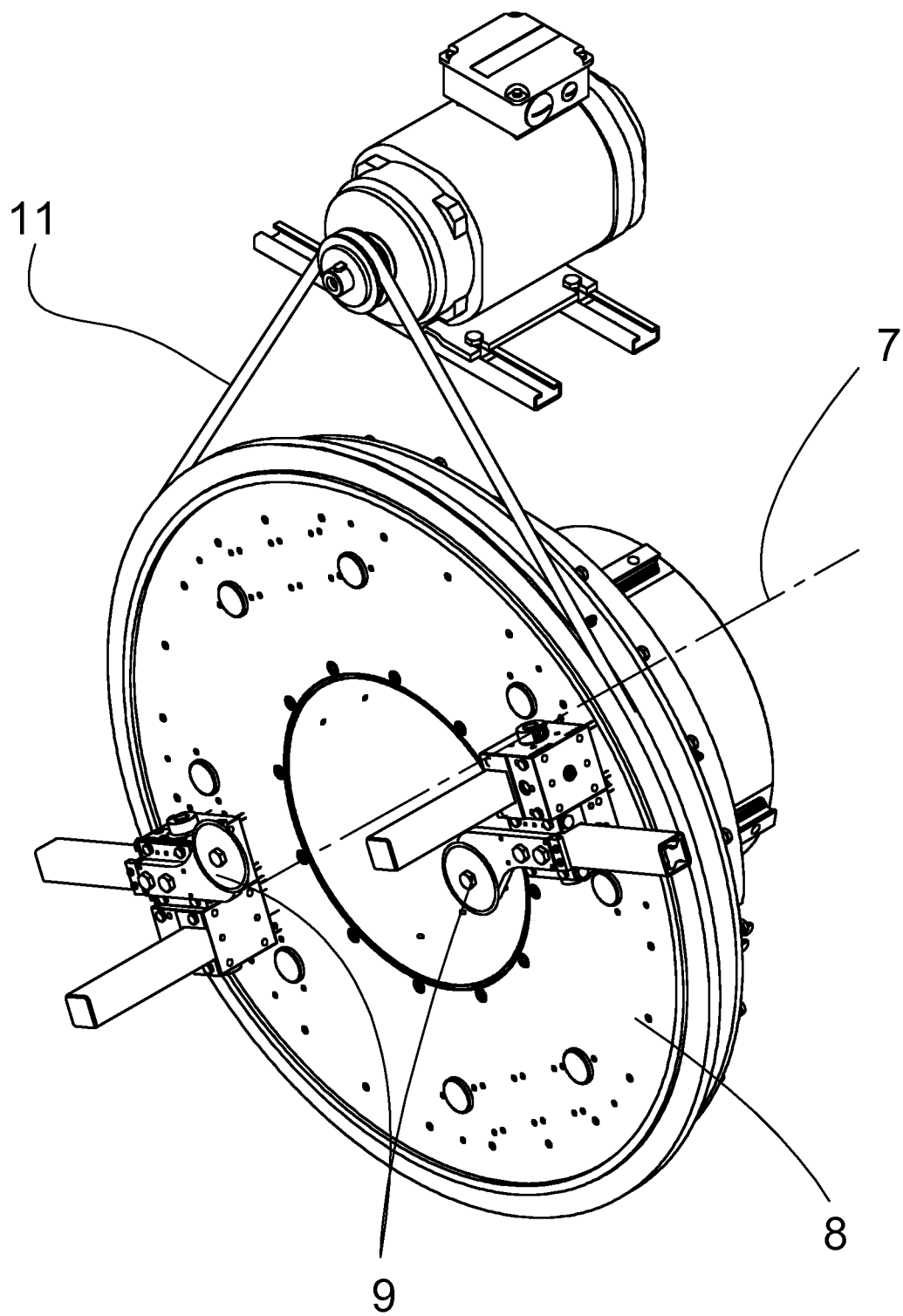
FIG. 2 shows a perspective view of part of a separating device.

FIG. 2 shows a perspective illustration of the device according to the invention with the rotating separating unit 8 and the cutting tools 9 arranged thereon. The separating unit 8 can be rotated about the extrusion axis 7.

Figure 3:
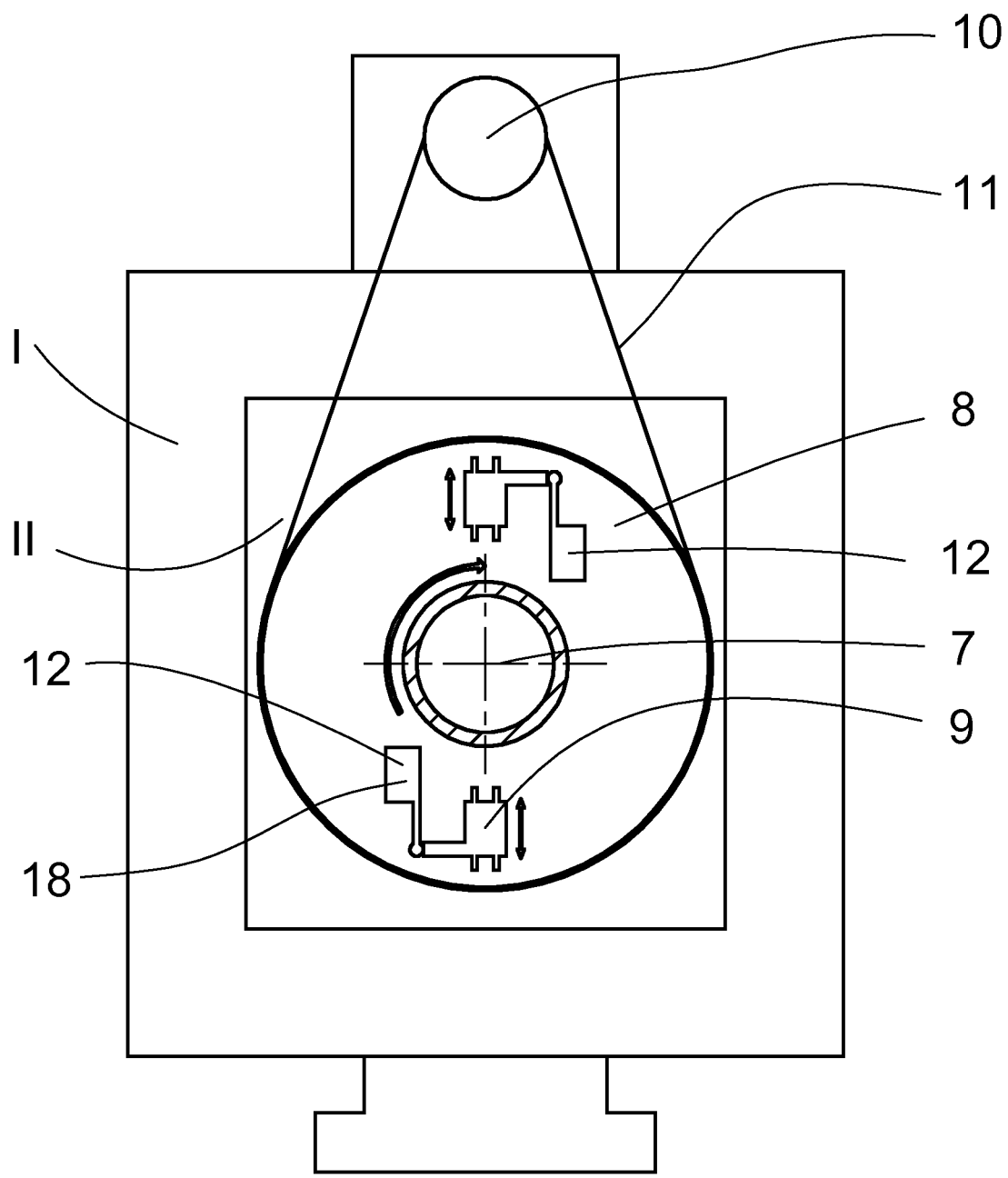
FIG. 3 shows a basic diagram.

FIG. 3 shows schematically the stationary outer region I and the inner region II, in which moving parts are arranged. The rotatable separating unit 8 with the cutting device 7 is arranged in the inner region II. The mounting disk can be rotated about the extrusion axis 7 via a drive 10 by means of a belt 11. Energy must then be transferred from the stationary outer region I to the inner region II to make possible a separating process by means of the cutting tools 9. Because more energy is required for the cutting process, it can be made available by way of the energy storage device 12, which is arranged in the inner region II, and the electromechanical drive 18.

Figure 4:
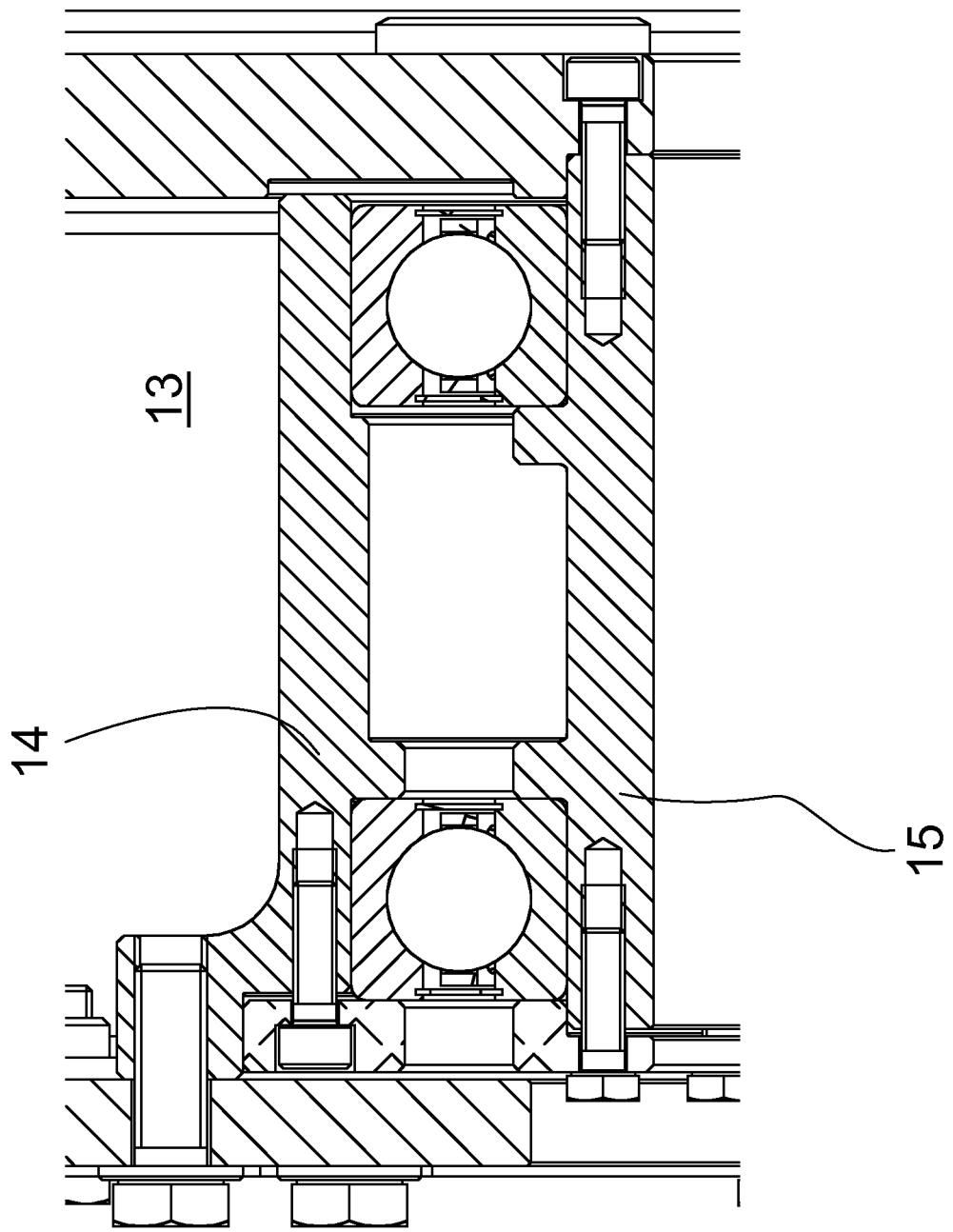
FIG. 4 shows a bearing via which energy can be transferred.

FIG. 4 shows another energy transfer option. Here, the energy can be transferred from the stationary part—the stator 14—to the moving part—the rotor 15—via the bearing 13 by means of the rolling elements. The rolling element has linear contact, not point contact, thereby allowing high energy transfer. If the rolling element is additionally provided with an elastic surface, good contact between the two lines is additionally ensured.

Figure 5:
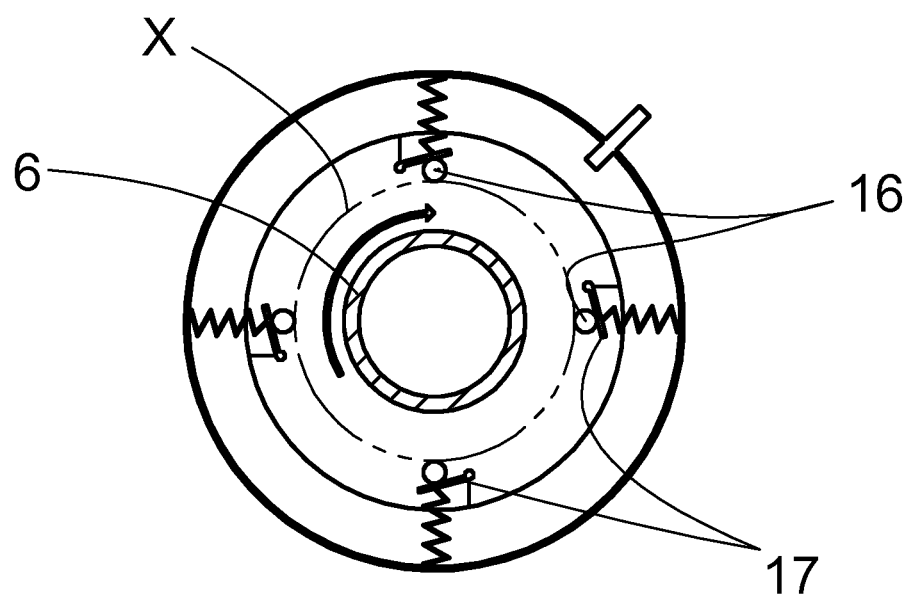
FIG. 5 shows a discontinuous power consumption system.

FIG. 5 shows energy transfer with the pipe 6 stationary. The energy is transferred and the energy storage device charged with each contact via the charging points 16 and the slip rings 17. The rotation is illustrated symbolically by the arrow and the line X.

Figure 6:
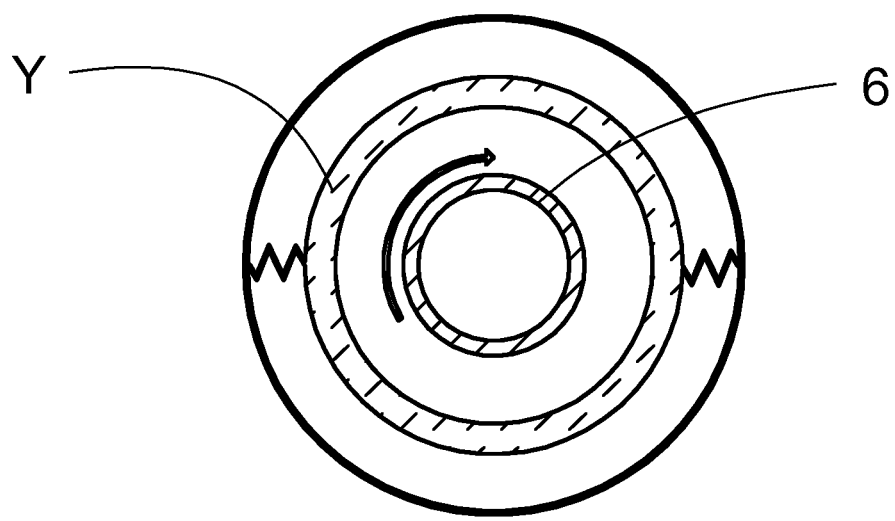
FIG. 6 shows a continuous power consumption system.

FIG. 6 shows a variant in which the energy is transferred directly by means of slip rings. Here too, the pipe 6 is stationary, and the rotating region is denoted by Y. Once again, the rotation is symbolized by means of the arrow.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 extruder
2 extrusion die
3 sizing and cooling tank
4 withdrawal device
5 separating device
6 profile
7 extrusion axis
8 rotating separating unit
9 cutting tool
10 drive for 8
11 drive belt for 8
12 energy storage device
13 bearing for 8
14 stator in 13
15 rotor in 13
16 charging point
17 slip ring
18 electromechanical drive
I outer region
II inner region
X rotating region I
Y rotating region II

The invention claimed is:

1. A method for cutting an extruded pipe to length using a separating device comprising a separator rotating about an extrusion axis of the extruded pipe, the separator being rotatably mounted in the separating device, and cutting tools being arranged on the separator, the cutting tools configured to carry out separation, the method comprising:
    transferring energy to move the cutting tools, wherein:
        the energy is transferred from a stationary outer region of the separating device to a movable inner region of the separating device,
        the energy is transferred continuously or cyclically and the transferred energy is buffered in an energy store,
        the energy is transferred inductively or capacitively, and
        a discharge time of the energy store is between 2% and 25% of a total separation cycle wherein the energy is buffered in the energy store to move the cutting tools to carry out the separation.

2. The method as claimed in claim 1, wherein the energy is transferred to a capacitor, the energy store being the capacitor.

3. The method as claimed in claim 1, wherein the energy is transferred via a bearing in which a stator and a rotor are arranged for energy transfer.

4. The method as claimed in claim 1, wherein the energy transfer takes place in a manner coupled with a force transmission.

5. The method as claimed in claim 1, wherein the energy transfer takes place via metal parts incorporated into a belt.

6. The method as claimed in claim 1, wherein the energy transfer takes place via slip rings.

7. The method as claimed in claim 1, wherein the energy transfer comprises low currents not requiring safeguards against electric shock.

* * * * *